Figure 1:
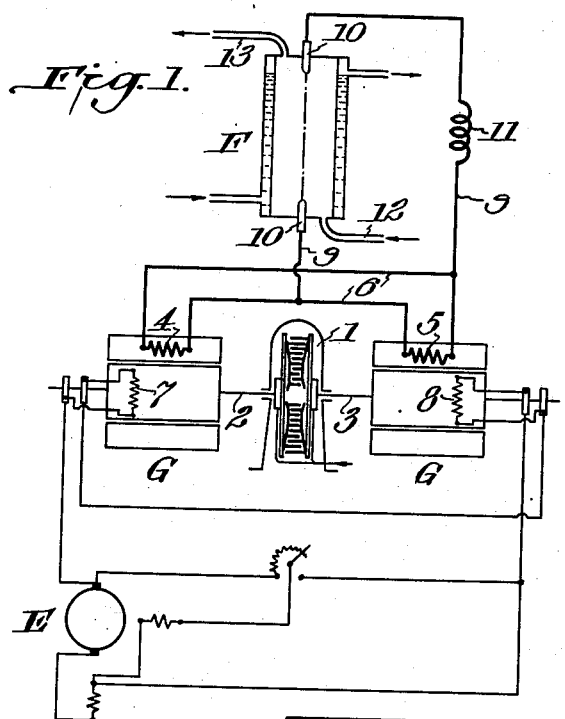

Dec. 31, 1935. R. KRANZ 2,026,474
GENERATOR
Filed July 15, 1933 3 Sheets-Sheet 1

Inventor:
Rudolf Kranz,
By Potter, Pierce & Scheffler,
Attorneys.

Dec. 31, 1935.　　　　R. KRANZ　　　2,026,474
GENERATOR
Filed July 15, 1933　　　3 Sheets-Sheet 2

Inventor:
Rudolf Kranz,
By Potter, Pierce & Scheffler,
Attorneys.

Dec. 31, 1935.   R. KRANZ   2,026,474
GENERATOR
Filed July 15, 1933   3 Sheets-Sheet 3

Inventor:
Rudolf Kranz,
By Potter, Pierce & Scheffler,
Attorneys

Patented Dec. 31, 1935

2,026,474

UNITED STATES PATENT OFFICE 2,026,474

GENERATOR

Rudolf Kranz, Heidelberg, Germany, assignor to Aktiengesellschaft Brown, Boveri & Cie, Baden, Switzerland, a joint-stock company Application July 15, 1933, Serial No. 680,622
In Germany October 30, 1931

3 Claims. (Cl. 290—4)

This invention relates to electric generators for supplying current to loads which are subject to sudden and wide fluctuations in magnitude, such as the load or power demand of electric arc furnaces, and particularly to generators driven by counterflow steam turbines.

The choice of current, i. e., direct current or alternating current of either the usual low frequencies or a high frequency, is determined by the nature of the process to be carried on in the furnace and, with all types of current, special arrangements must be provided to stabilize or prevent extinction of the arc. With an alternating current supply, the practice is to introduce inductance in the circuit to establish a phase displacement that results in a substantial voltage for reestablishing the arc at the instant the current falls to zero. When a direct current supply is employed, the generator is provided with a compound winding for stabilizing the arc, the series winding opposing the field of the shunt winding to reduce the field strength on short circuits and thus prevent a substantial increase in the current flow. In the case of a direct current supply by rectification of alternating current, the arc may be stabilized by inductance in the alternating current circuit, the inductive reactance being provided by choke coils or by the high leakage reactance of a transformer feeding the rectifier.

Special problems are introduced when the generators are driven by counterflow turbines of the type in which the steam flows radially between two turbine disks with concentric rows of blades, the blades of one disk being located in the space between adjacent rows of blades of the opposite disk.

The disks rotate in opposite directions, and the shaft of each carries the rotor of at least one generator. It will be apparent that the torque at each disk will be the same, but that the rotary speed of and the power developed by each disk depend upon the load imposed upon the disk. The conditions of operation of one generator will react upon the other generator and the known stabilizing systems, as above outlined, are not sufficient to insure stability when the generators are driven by a counterflow turbine.

The consumption of power of an arc is dependent on many influences of a physical or chemical nature. The chemical reaction in the arc is endothermic, i. e., for carrying on the reaction, consumption of heat or energy is necessary, and the consumption of power is variable with equal length of flame according to the influence of the composition and the speed of reaction of the gas, the temperature and the pressure of the gas, of the electrode material and other influences. Upon a variation of one of these factors, with equal length of flame, a considerable increase in voltage may be necessary in order to maintain the arc, and an increase in the strength of current in order to produce a steady flame. These fluctuations in the load which an arc imposes on one generator would be transmitted to the other alternating current generator coupled to the counterflow turbine, and then to the other arc fed by this generator, thus resulting in instability or the extinction of the second arc. When short-circuits occur in the arc, the torsion of the counterflow turbine would accelerate the turbine disk associated with the short-circuited furnace, and the turbine would race or the supply of steam would be cut off automatically by suitable devices. In either case, the arc of the other arc furnace would be extinguished, so that operation with this arrangement is not possible.

An object of the present invention is to provide a current supply system for the stable operation of one or more electric arcs, which system includes a plurality of generators driven by a counterflow turbine. A further object is to provide a current supply system of the type stated, and in which the current for feeding an arc or plurality of arcs is supplied jointly by the two generators or two sets of generators driven by the counterflow turbine. More particularly, an object is to provide an electric furnace system in which the electric arc is fed, by the two generators, connected either in series or in parallel as may be desired, driven by a counterflow turbine.

These and other objects and advantages of the invention will be apparent from the following specification, when taken with the accompanying drawings in which:

Figs. 1 to 5 inclusive are circuit diagrams illustrating a plurality of embodiments of the invention.

In each of the several views, the reference numeral 1 identifies a counterflow steam turbine having a pair of shafts 2, 3, which carry the rotor elements of a pair of generators G. As shown in Fig. 1, the generators G are single phase alternating current generators having stationary armature windings 4, 5, respectively, which are connected in parallel by the mains or bus bars 6, the rotating field windings 7, 8, being energized by a direct current exciter E. Leads 9 extend from the mains 6 to the electrodes 10 of the arc furnace F and an inductive reactance 11 is included in either or both of the furnace leads 9, the reactance 11 effecting a suitable phase displacement of the alternating voltage and current and, preferably, being of such magnitude that the voltage across the mains 6 will not fall to zero in the event that the electrodes are short-circuited.

The furnace may, of course, be of any desired type and is illustrated diagrammatically as a water cooled furnace for effecting a desired reaction between gaseous components which enter the reaction chamber through an inlet pipe 12 and, in altered form, pass out of the chamber by an outlet pipe 13. With this parallel connection of the armature windings, it is apparent that the disks of the turbine will run in synchronism for all values of the load imposed upon the generators by the arc furnace.

Figure 2:
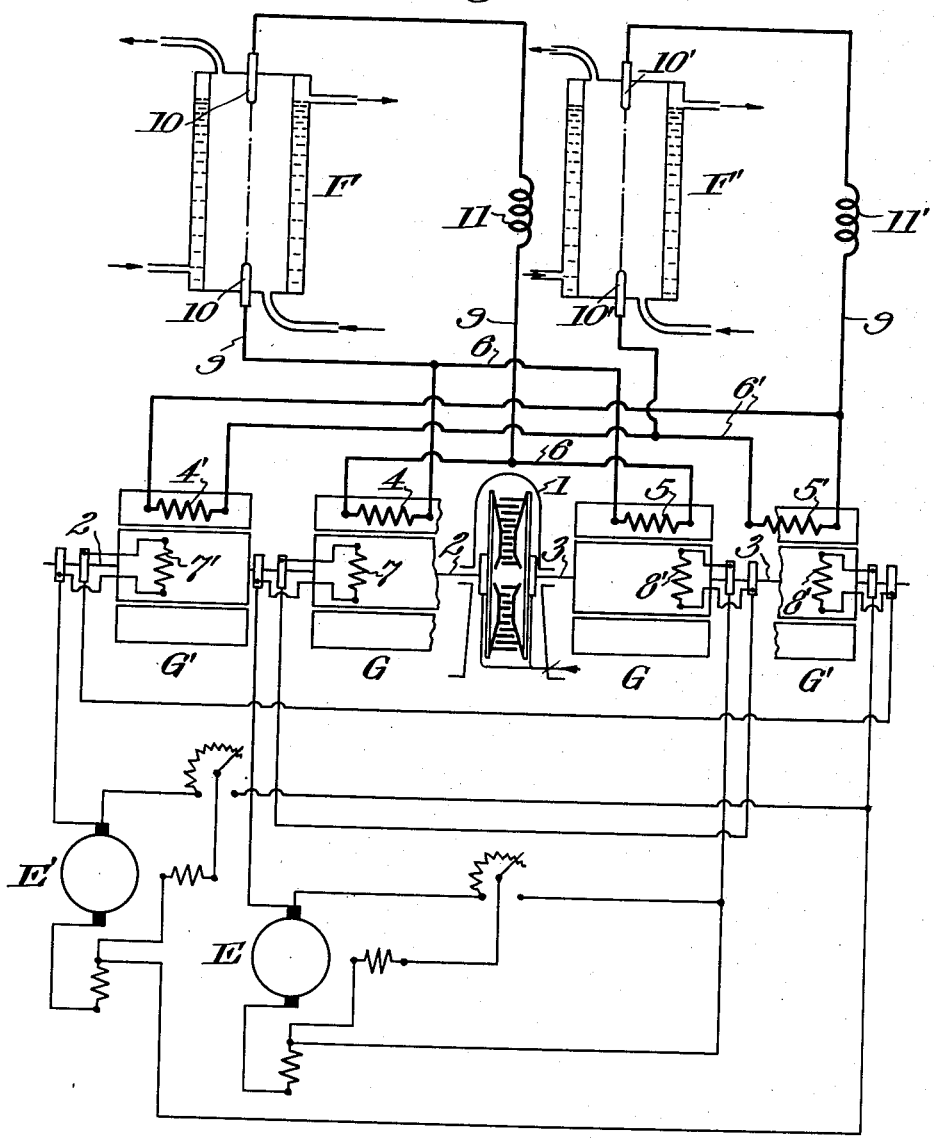

As shown in Fig. 2, the single phase generator system of Fig. 1 may be duplicated by arranging an additional pair of generators G', G' on shafts 2, 3 to supply current to a second furnace F'. The various circuit elements of the generators G and furnace F are identified by the corresponding reference numerals of Fig. 1, and the circuit elements of generators G', G' and furnace F' are identified by corresponding but primed reference numerals. A separate exciter E' is illustrated for supplying current to the rotating field windings 7', 8' of generators G', but it will be apparent that a single exciter may be used for both sets of generators.

Figure 3:
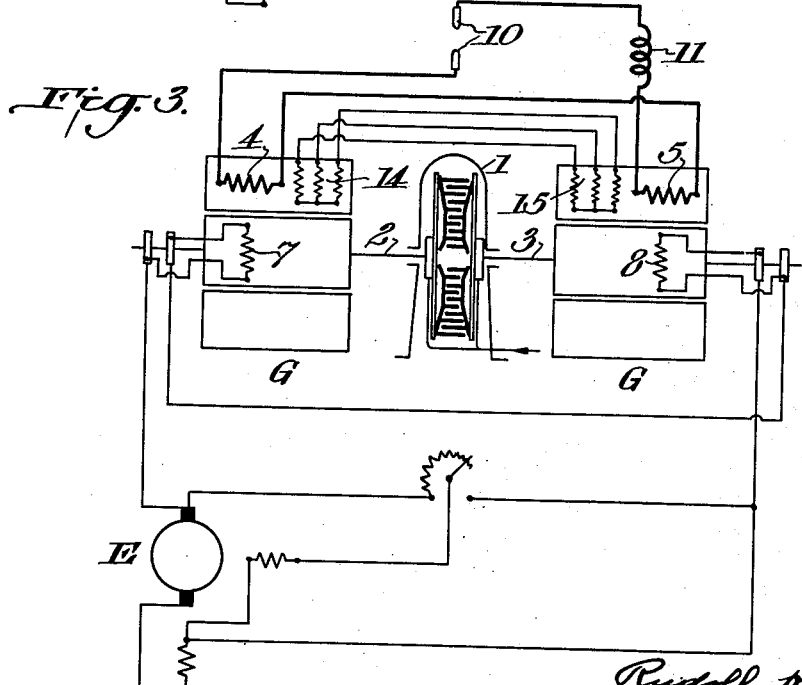

As illustrated in Fig. 3, the windings 4, 5 of the alternating current generators are connected in series with the arc electrodes 10 and the inductive reactance 11. With this arrangement some means, such as the parallel connected multiphase windings 14, 15 on the stators, must be provided to insure synchronism of the two disks of the turbine 1. The multiphase windings are so designed or adjusted that voltages of like phase are induced in the main windings 4, 5 of the stators of generators G, G. Since the generators are excited in series from the exciter E, the current flow in the multiphase circuits will be relatively weak.

In the case of direct current generators, the same condition exists that prevents operation of individual arc furnaces by the two generators driven by a counterflow turbine. A change in the load on one generator would result in instability of a furnace fed by the other generator.

Figure 4:
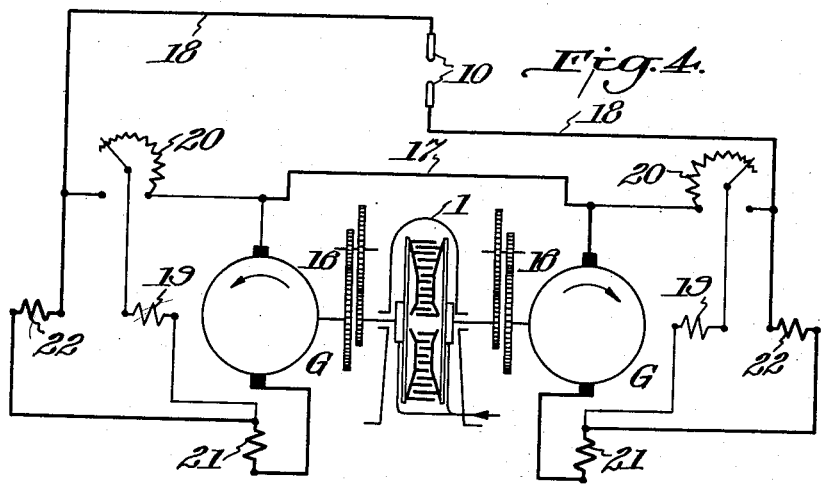

As shown in Fig. 4, the armatures of the direct current generators G, G are driven from turbine 1 through reduction gearing 16, the windings of the generators being serially connected by a lead 17, and connected in series with the arcing electrodes 10 by leads 18. The generators are self-exciting and include a shunt winding 19 in series with a control rheostat 20 and a compounding series winding 21. A further series field winding 22 is included in the circuit of each generator, and this winding acts in opposition to the shunt winding 19 to reduce the field strength in the case of a short-circuit of electrodes 10.

Figure 5:
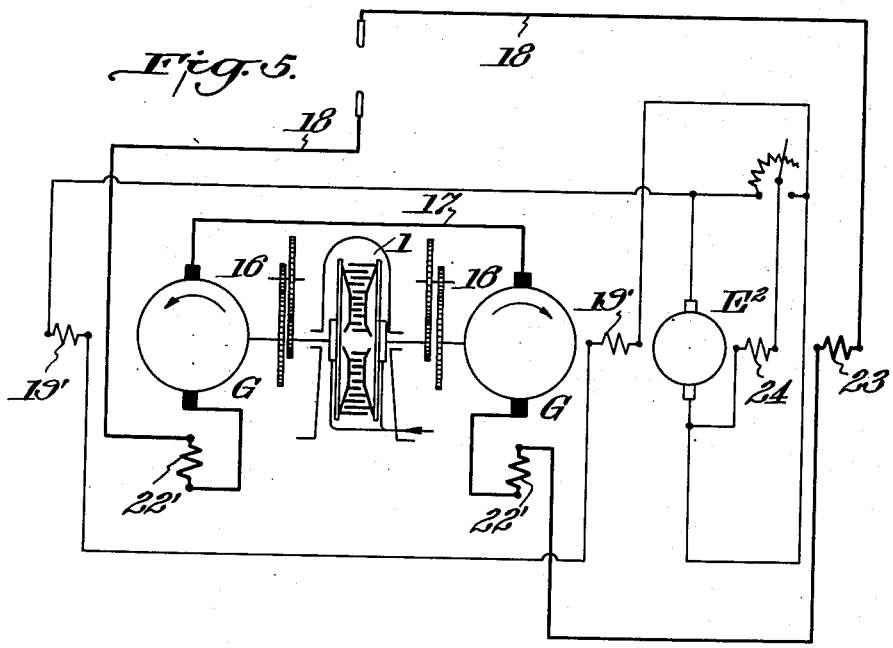

As shown in Fig. 5, the separate generators G, G of a direct current system may be separately excited, in series, by windings 19' which are energized by a separate exciter E². Series field windings 22' are provided on the generators to oppose the field due to the windings 19' and, preferably, one of the leads 18 to the furnace electrodes 10 includes the winding 23 on the separate exciter E², the winding 23 acting in opposition to the shunt field winding 24 of exciter E² to reduce the excitation current in the event of a short-circuit of the furnace electrodes.

Since the direct current generators are connected in series and have the same field excitation, it is not necessary to include any special arrangement to insure synchronous operation of the two units of the turbine. Equal torques are applied to the two units and, since the same current flows through both generators, the output voltages and the rotary speeds will be the same for both units. With unequal field excitation, the units will operate at different speeds but the stability of operation will be preserved.

While certain typical embodiments of the invention have been illustrated and described, it will be apparent that there is some latitude in the constructions and circuit arrangements for carrying out the invention and that there may be considerable variation from the described arrangements without departure from the spirit of my invention as set forth in the following claims.

I claim:

1. In apparatus for supplying current to a load that is subject to rapid and wide fluctuations in magnitude, a counterflow turbine having a pair of shafts running in opposite directions, a pair of generators having the rotors thereof driven by the respective shafts, each generator having field and armature windings, a single output circuit for said armature windings to supply power to the fluctuating load, and means maintaining the ratio of the power outputs of the separate generators substantially constant in spite of rapid fluctuations of the load, said means including a direct current exciter and means connecting the field windings of said generators in series with said exciter.

2. Apparatus as claimed in claim 1, wherein said generators are alternating current generators, and said means includes multiphase windings on the generator armatures and connected together in parallel, whereby the synchronous operation of the generators and the correct phase relation of the partial voltages are assured.

3. Apparatus as claimed in claim 1, wherein said generators are direct current generators, and the field windings of each generator include a demagnetizing field winding in series with the associated armature winding.

RUDOLF KRANZ.